United States Patent Office 3,257,406
Patented June 21, 1966

1

3,257,406
3-METHOXY-6β-HYDROXY-N-METHYL-Δ⁷-MORPHINAN (CIS)
Yoshiro Sawa, Hyogo Prefecture, and Naoki Tsuzi and Haruhiko Tada, Osaka Prefecture, Japan, assignors to Shionogi & Co., Ltd., Osaka, Japan
No Drawing. Original application Apr. 4, 1963, Ser. No. 270,558. Divided and this application Apr. 28, 1964, Ser. No. 372,133
Claims priority, application Japan, Apr. 9, 1962, 37/14,250
1 Claim. (Cl. 260—285)

This is a division of application Serial No. 270,558, filed April 4, 1963.

The present invention relates to 6-hydroxymorphinan derivatives and production thereof.

In the term "morphinan" herein employed, there are included all the compounds having a fundamental structure representable by the following plane formula:

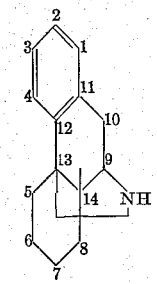

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro-2H-10,4a-iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The objective 6-hydroxymorphinan derivative in the present invention is representable by the following plane formula:

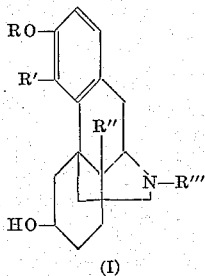

wherein R represents a hydrogen atom, a lower alkyl group (e.g. methyl, ethyl, propyl) or an acyl group such as lower alkanoyl (e.g. acetyl, propionyl, butyryl), R′ represents a hydrogen atom, an aryloxy group (e.g. phenyloxy, naphthyloxy) or a substituted aryloxy group (e.g. substituted phenyloxy, substituted naphthyloxy)

2 wherein the substituent is lower alkyl (e.g. methyl, ethyl, propyl, lower alkoxy (e.g. methoxy, ethoxy, propoxy), nitro or amino, R″ represents a hydrogen atom, a hydroxyl group or an acyloxy group such as lower alkanoyloxy (e.g. acetyloxy, propionyloxy, butyryloxy), R‴ represents a hydrogen atom, a lower alkyl group (e.g. methyl, ethyl, propyl) or an ar(lower)alkyl group (e.g. benzyl, phenethyl) and a double bond is present on the C ring and shows various pharmacological activities such as analgesic activity and antitussive activity.

Accordingly, a basic object of the present invention is to embody the 6-hydroxymorphinan derivative of Formula I. Another object of the invention is to embody the pharmacologically active 6-hydroxymorphinan (I). A further object of the invention is to embody a process for preparing the 6-hydroxymorphinan (I). These and other objects will be apparent to those conversant with the art to which the present invention pertains from the subsequent description.

The process of the present invention is illustratively represented by the following scheme:

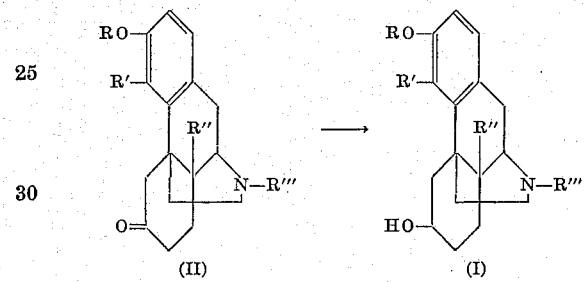

wherein R, R′, R″ and R‴ each has the same significance as designated above and a double bond is present on the C ring.

As the starting material, there may be used the optically active or racemic 6-oxomorphinan of Formula II.

According to the process of the present invention, the starting 6-oxomorphinan (II) is subjected to reduction to produce the 6-hydroxymorphinan (I). For attaining the object, there may be adopted various reduction procedures such as an electrolytic reduction method, a catalytic reduction method, a reduction method using alkali alkoxide, a reduction method using amalgam (e.g. sodium-amalgam, aluminum-amalgam), a reduction method using metallic hydride (e.g. lithium aluminum hydride, sodium borohydride) and Meerwein-Pondorf reduction method. The reaction medium may be suitably selected on the property of the starting 6-oxomorphinan (II) and the adopted reduction procedure. Examples of the reaction medium includes water, acetic acid, methanol, ethanol, ether, tetrahydrofuran, dioxane, chloroform, dichloromethane, benzene, toluene, etc. As the result of the reduction reaction, there is usually obtained a mixture of the 6α-hydroxymorphinan (Ia) and the 6β-hydroxymorphinan (Ib). However, either of these two isomers can be predominantly prepared by adopting a suitable reduction procedure. For instance, the catalytic reduction using acetic acid affords selectively the 6-hydroxymorphinan (I) wherein the hydroxyl group takes axial conformation, while the reduction using sodium-amalgam gives predominantly the 6-hydroxymorphinan (I) wherein the 6-hydroxyl group takes equatorial conformation. Further, for instance, the reduction using metallic hydride and the Meerwein-Pandorf reduction generally produce a mixture of the said two isomers, each being present in a considerable amount. When the mixture is obtained, each isomer can be isolated by a conventional separation procedure (e.g. chromatography, fractional recrystallization).

The objective 6-hydroxymorphinan (I) occurs in optically active form as well as in racemic mixture and these are all within the scope of the present invention.

The 6-hydroxymorphinan (I) forms acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The thus-produced 6-hydroxymorphinan (I) and acid addition salts thereof exhibit pharmacological activity such as analgesic activity and antitussive activity. For instance, the analgesic activity, antitussive activity and toxicity of a compound according to the present invention is shown in the following table:

TABLE

| Compound | Analgesic activity | Antitussive activity | Toxicity (LD$_{50}$, mg./kg.) |
|---|---|---|---|
| (−)-3,6α-Dihydroxy-N-methyl-morphinan (cis) acetate | 0.1 | 1.4 | 172.4 |

NOTE.—The analgesic activity was observed by the Haffner-Hesse method [Hesse: Arch. exp. Path. u. Pharm., vol. 158, p. 233 (1930)] in mice and is shown as the effective ratio to morphine, the value of which is expressed as 1. The antitussive activity was observed by the Winter method [Winter et al.: J. Exper. Med., vol. 101, p. 17 (1955)] in guinea pigs and is shown as the effective ratio to codeine, the value of which is expressed as 1. The toxicity was tested by intravenous administration of the tested compound to mice.

Other 6-hydroxymorphinans (I) show similar activities. Accordingly, they are useful as analgesic and/or antitussive agents.

Practical and presently preferred embodiments of the present invention are illustrated by the following examples. In the examples, mg.=milligrams(s), g.=grams(s), ml.=millilitre(s) and °C=degrees centigrade. Other abbreviations have conventional meanings.

*Example 1*

Preparation of (+) - 3 - methoxy - 6α - hydroxy - N-methyl - Δ$^7$ - morphinan (cis) and (−) - 3 - methoxy-6β-hydroxy-N-methyl-Δ$^7$-morphinan (cis):

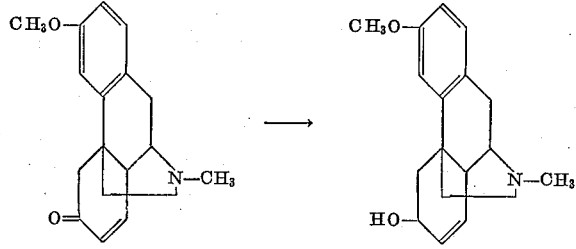

To a solution of aluminum triisopropoxide (2.1 g.) in isopropanol (20 ml.), there is added (−)-3-methoxy-6-oxo-N-methyl-Δ$^7$-morphinan (cis) (2.9 g.), and the resultant mixture is distilled according to Meerwein-Pondorf reduction procedure whereby the produced acetone is completely distilled off in about 5 hours. After cooling, the reaction mixture is evaporated. The residue is dissolved in benzene, combined with water to decompose the aluminum triisopropoxide, N sodium hydroxide added thereto and shaken with benzene. The benzene layer is evaporated and the residue dissolved in ether. The ether layer is chromatographed on alumina. The eluate with ether is treated with hydroxylamine for purification and shaken with aqueous sodium hydroxide. The insoluble substance is crystallized from etheyl acetate to give (+)-3 - methoxy - 6α - hydroxy - N - methyl - Δ$^7$ - morphinan (cis) (1.0 g.) as crystals melting at 153 to 154° C. [α]$_D^{18}$ +74.8° (methanol).

*Analysis.*—Calcd. for C$_{18}$H$_{23}$O$_2$N: C, 75.75; H, 8.12; N, 4.91. Found: C, 75.81; H, 8.14; N, 4.92.

The eluate with 1% ethanolic ether is evaporated and the residue crystallized from isopropanol to give (−)-3-methoxy - 6β - hydroxy - N - methyl - Δ$^7$ - morphinan (cis) (1.0 g.) as crystals melting at 149.5 to 150.5° C. [α]$_D^{27}$ −46.3° (ethanol).

*Analysis.*—Calcd. for C$_{18}$H$_{23}$O$_2$N: C, 75.75; H, 8.12; N, 4.91. Found: C, 75.95; H, 8.16; N, 4.87.

The starting material of this example, (−)-3-methoxy-6 - oxo - N - methyl - Δ$^7$ - morphinan (cis), is prepared from (−)-3,6-dimethoxy-N-methyl-Δ$^{5,8}$-morphinan (cis) [Sawa et al.: Tetrahedron, vol. 15, p. 154 (1961)], according to the following scheme:

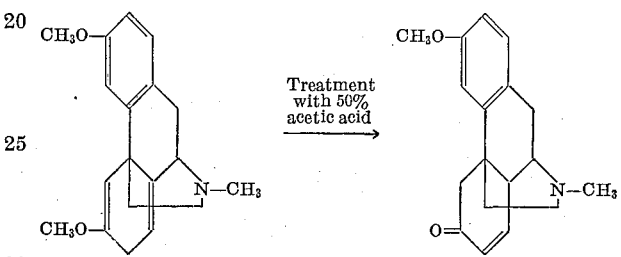

*Example 2*

Preparation of (−) - 3 - methoxy - 6α - hydroxy - N-methyl-Δ$^7$-morphinan (trans) and (−)-3-methoxy-6β-hydroxy-N-methyl-Δ$^7$-morphinan (trans):

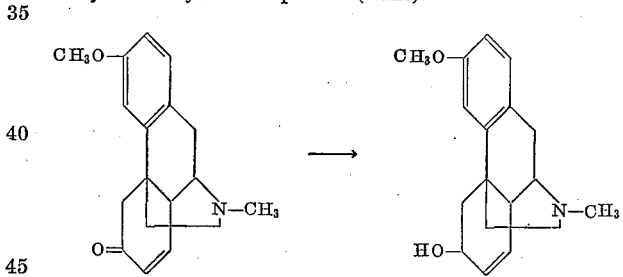

To a solution of (−)-3-methoxy-6-oxo-N-methyl-Δ$^7$-morphinan (trans) (3.40 g.) in ethanol (60 ml.), there is added sodium borohydride (454 mg.), and the resultant mixture is stirred for 1.5 hours at room temperature (10 to 30° C.) and then allowed to stand one overnight. The reaction mixture is evaporated to remove the solvent. The residue is combined with water (50 ml.), stirred for 1 hour and shaken with benzene. The benzene layer is evaporated and the residue (3.35 g.) chromatographed on alumina (45 g.). The benzene eluate is evaporated to give (−) - 3 - methoxy - 6β - hydroxy - N - methyl - Δ$^7$-morphinan (trans) (1.77 g.) as an oil. [α]$_D^{25}$ −38.4° (chloroform). The oil is treated with picric acid in ethanol and crystallized from ethanol to give (−)-3-methoxy-6β-hydroxy-N-methyl-Δ$^7$-morphinan (trans) picrate as crystals melting at 195 to 197° C.

*Analysis.*—Calcd. for C$_{18}$H$_{23}$O$_2$N·C$_6$H$_3$O$_7$N$_3$: C, 56.03; H, 5.09; N, 10.89. Found: C, 55.66; H, 5.49; N, 10.77.

The eluate with chloroform is evaporated to give (−)-3 - methoxy - 6α - hydroxy - N - methyl - Δ$^7$ - morphinan (trans) (1.08 g.) as an oil. [α]$_D^{24.5}$ −12.5° (ethanol). The oil is treated with picric acid in ethanol and crystallized from ethanol to give (−)-3-methoxy-6α-hydroxy-N-methyl-Δ$^7$-morphinan (trans) picrate as crystals melting at 210 to 211° C. (decomp.).

*Analysis.*—Calcd. for C$_{18}$H$_{23}$O$_2$N·C$_6$H$_3$O$_7$N$_3$: C, 56.03; H, 5.09; N, 10.89. Found: C, 56.27; H, 5.34; N, 10.58.

The starting material of this example, (−)-3-methoxy-6-oxo-N-methyl-Δ$^7$-morphinan (trans), is prepared from (—) - 3,6 - dimethoxy - N - methyl - $\Delta^{5,8}$-morphinan (cis) according to the following scheme:

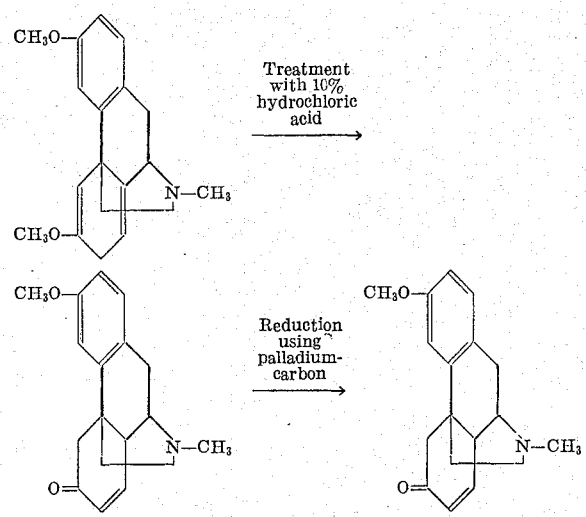

Example 3

Preparation of (—)-3,6α-dihydroxy-N-methyl-$\Delta^7$-morphinan (cis) and (—)-3,6β-dihydroxy-N-methyl-$\Delta^7$-morphinan (cis):

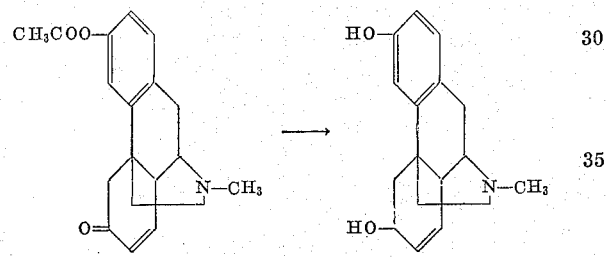

To a mixture of (—)-3-acetyloxy-6-oxo-N-methyl-$\Delta^7$-morphinan (cis) (9.34 g.), aluminum triisopropoxide (12.24 g.) and isopropanol (60 ml.), there is added dropwise isopropanol (420 ml.) while heating whereby the produced acetone is distilled off. After the distillation of acetone is completed in 5 hours, the reaction mixture is evaporated to remove isopropanol, combined with chloroform (150 ml.) and water (20 ml.) dropwise added thereto. After separation of aluminum hydroxide by filtration, the filtrate is evaporated to remove chloroform and isopropanol completely. The residue is combined with chloroform (100 ml.) and allowed to stand one overnight. The precipitate is collected by filtration and crystallized from acetone to give (—)-3,6β-dihydroxy-N-methyl-$\Delta^7$-morphinan (cis) (2.82 g.) as crystals melting at 247 to 248° C. $[\alpha]_D^{23}$ —44.9° (ethanol).

*Analysis.*—Calcd. for $C_{17}H_{21}O_2N$: C, 75.24; H, 7.86; N, 5.16. Found: C, 75.12; H, 7.86; N, 5.13.

The above separated aluminum hydroxide is dissolved into aqueous sodium hydroxide, bubbled with carbon dioxide and shaken with 3% ethanolic chloroform. The ethanolic chloroform layer is combined with the filtrate which was separated from the precipitate above, treated with activated carbon (2 g.) and filtered. The filtrate is evaporated and the residue chromatographed on alumina. The eluate with 3% ethanolic chloroform is evaporated and crystallized from acetone to give (—)-3,6α-dihydroxy-N-methyl-$\Delta^7$-morphinan (cis) (76 mg.) as crystals melting at 216 to 218° C.

The starting material of this example, (—)-3-acetyloxy-6-oxo-N-methyl-$\Delta^7$-morphinan (cis), is prepared from (—)-3-methoxy-6-oxo-N-methyl-$\Delta^7$-morphinan (cis) [cf. Example 8 of this specification] according to the following scheme:

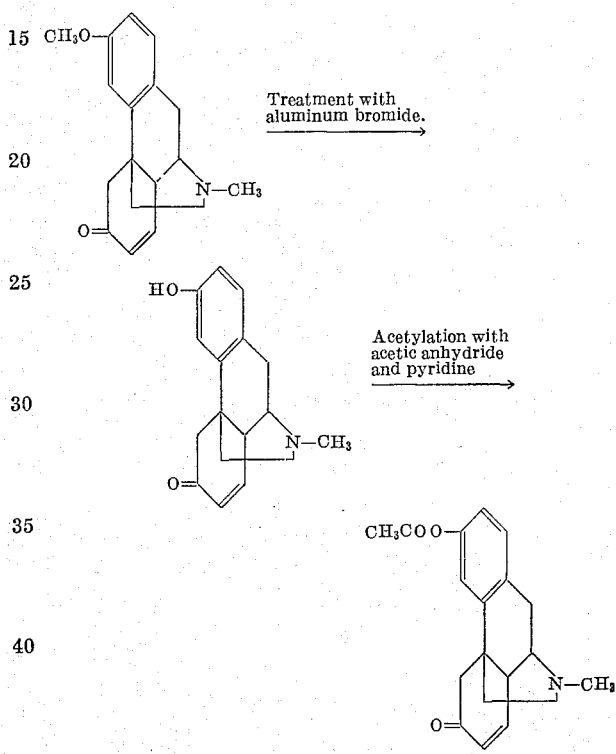

What is claimed is:
(—) - 3 - methoxy - 6β - hydroxy - N - methyl - $\Delta^7$-morphinan (cis).

References Cited by the Examiner
UNITED STATES PATENTS 2,766,245  10/1956  Gates _____ 260—285
3,085,091   4/1963  Sawa  _____ 260—285

OTHER REFERENCES

Goto, Sinomenine Kitasato Institute, 1964, pp. 99, 100, 104, and 138 relied upon.

NICHOLAS S. RIZZO, *Primary Examiner.*

DONALD G. DAUS, *Assistant Examiner.*